United States Patent [19]

Brundige, Jr.

[11] Patent Number: 4,563,201

[45] Date of Patent: Jan. 7, 1986

[54] METHOD AND APPARATUS FOR THE PRODUCTION OF LIQUID GAS PRODUCTS

[75] Inventor: Virgil L. Brundige, Jr., Grand Prairie, Tex.

[73] Assignee: Mobil Oil Corporation, New York, N.Y.

[21] Appl. No.: 631,686

[22] Filed: Jul. 16, 1984

[51] Int. Cl.[4] .................................................. F25J 3/00
[52] U.S. Cl. .......................................... 62/11; 62/38; 62/116; 62/500
[58] Field of Search ...................... 62/9, 11, 36, 38, 39, 62/116, 499, 500; 60/651, 671

[56] References Cited

U.S. PATENT DOCUMENTS 4,179,897 12/1979 Hvizdos et al. ............................ 62/9
4,336,693 7/1982 Hays et al. .

OTHER PUBLICATIONS

"Biphase Turbine Tests on Process Fluids" by Norman L. Helgeson and J. Philip Maddox, Transamerica Delaval Inc., Biphase Energy Systems, Santa Monica, Calif.

"Using the Biphase Turbine to Generate Useful Energy from Process Streams", by Norman L. Helgeson and Walter R. Studhalter, Biphase Energy Systems, Santa Monica, Calif.

Primary Examiner—Frank Sever
Attorney, Agent, or Firm—Alexander J. McKillop; Michael G. Gilman; Charles J. Speciale

[57] ABSTRACT

A method and apparatus are disclosed for increasing the production of liquid natural gas and conserving energy and reducing vapor production, while reducing equipment cost, in a liquid natural gas manufacturing installation. A liquid gas stream from a main exchanger is fed to a bi-phase rotary separator, which separates a vapor phase from the liquid phase without requiring an expansion valve and flash device, or liquid pump, as is commonly used. Optionally, work can also be extracted from the stream by the separator.

7 Claims, 1 Drawing Figure

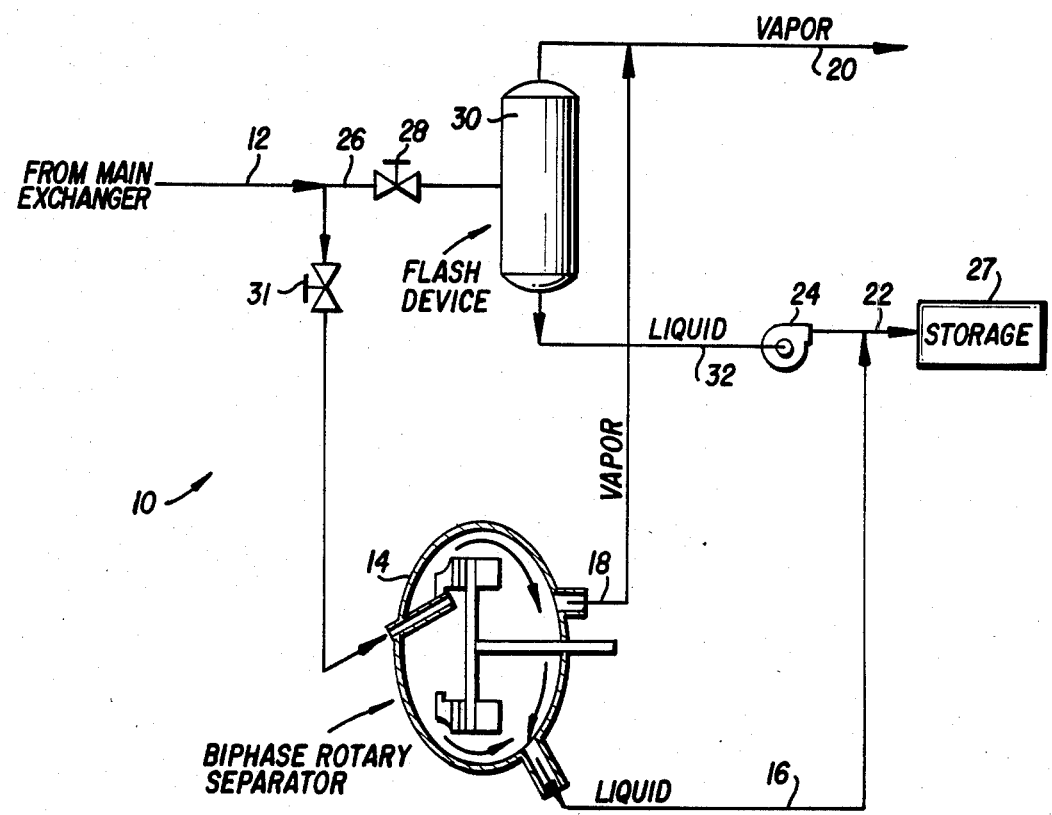

METHOD AND APPARATUS FOR THE PRODUCTION OF LIQUID GAS PRODUCTS

BACKGROUND OF THE INVENTION

1. Field of the Invention

The present invention relates to a method and apparatus for the production of liquid gas products, such as liquid natural gas, and, more particularly, relates to a reduction in the quantity of formed flash gas and in equipment requirements in a liquid gas manufacturing installation through the novel utilization of a bi-phase rotary separator for separating liquid and gas phases which, optionally, can also extract work from a liquid gas flow.

2. Discussion of the Prior Art

In liquid natural gas manufacturing facilities wherein liquid natural gas is conveyed from the manufacturing facility to a storage location subsequent to being flashed in a low pressure flash, a continuous stream of the liquid natural gas is conducted, as is well known, from a main exchanger of the liquid natural gas manufacturing facility through either a Joule-Thomson valve, or a reversely operating pump which removes work from the flow, and then to a low-pressure flash in which the effluent from the Joule-Thomson valve or a reversely operating pump is divided into a first flow consisting of liquid natural gas, and a second flow consisting of a natural gas vapor. The liquid natural gas is conducted through the intermediary of a suitable transfer pump to a storage facility, and the natural gas vapor is employed as fuel within the operating facility or plant.

Basically, the Joule-Thomson valve or reversely operating pump operate on the liquid natural gas stream flowing from the main exchanger of the liquid natural gas manufacturing facility at a very low, i.e., supercooled, temperature, thereby extensively reducing the temperature and pressure of the liquid flow. When a reversely operating pump is used within the facility, work is extracted and converted into mechanical or electrical energy through suitable shaft-coupled compressors, pumps or generators in order to power other installations or plant components. Thus, the energy state change through the Joule-Thomson valve, or the work recovered by the reversely operating pump, although relatively small in quantity, significantly enhances the production of liquid natural gas when flashed, while producing a lower volume of flash gas or natural gas vapor, thereby improving the economical operation of the manufacturing facility.

Although the utilization of Joule-Thomson valves and reversely operating pumps which extract work, such as centrifugal pumps or the like, result in an energy state change or the extraction of work from liquid streams under pressure, such as a cryogenic processing system for liquid natural gas which is conducted under high pressures and extremely low temperatures from the main exchanger of a liquid natural gas manufacturing facility, the energy state change or the work extracted has, generally, not been adequate to provide a degree of reduction in flash gas or natural gas vapor subsequent to flashing in a low pressure flash to a level of flash gas which meets the gas fuel requirements within the facility. Instead, an appreciable excess or waste of natural gases occurs, with a concomitant reduction in the production of processed liquid natural gas, so that the economic production potential of the liquid natural gas manufacturing facility is not fully realized.

In order to improve the economics of liquid natural gas production and to reduce the quantity of flash gas and resultingly increase the yield of liquid natural gas, an arrangement and method is disclosed in U.S. patent application Ser. No. 456,234, filed Jan. 7, 1983, for extracting work from a flow of liquid natural gas at extremely low temperatures with a hydraulic expander. The disclosure of this application is hereby incorporated herein by reference. The effluent from the hydraulic expander, when flashed in a low-pressure flash, produces a higher yield of liquid natural gas and, consequently, a lower proportion of flash gas, with an additional conservation of energy. The hydraulic expander is used in lieu of the conventional Joule-Thomson valve or reversely operating pump and the work extracted therefrom may be usefully employed in the facility to operate various power-driven components through suitable shaft-coupled compressors, pumps or generators. In a particularly advantageous arrangement, a Joule-Thomson valve is interposed in a flow conduit in parallel bypass relationship with the conduit incorporating the hydraulic expander and, in essence, is positioned intermediate a main exchanger of the liquid natural gas production facility and the low-pressure flash. The Joule-Thomson valve is closed during normal operation of the facility so as to render it inoperative and the entire flow of liquid natural gas passes through the hydraulic expander. The Joule-Thomson valve is rendered operative in an opened flow-through condition during periods when the hydraulic expander is shut down, or inoperative, to facilitate the continuous and uninterrupted operation of the liquid natural gas production facility, albeit at a somewhat lower degree of efficiency, without necessitating any shutdown of the system.

Although the just-described arrangement using a turbo-expander is advantageous in reducing the amount of produced vapor while extracting work from a flow of liquid natural gas, the vapor and liquid phase output from this device, in the form of effluent, must still pass to a conventional low pressure flash device for separating the liquid and vapor phases, with the liquid phase from the flash device then being pumped in conventional manner to a storage facility. The provision of a flash device and liquid pump naturally adds to the capital and maintenance costs of a liquid natural gas manufacturing installation.

SUMMMARY OF THE INVENTION

One object of the present invention is the provision of an improved method and apparatus for separating the liquid and vapor phases of a very low temperature, i.e., supercooled, liquified gas stream, such as liquid natural gas, which eliminates the requirement for a flash device and a liquified gas pump for pumping the liquid phase to a storage facility.

Another object of the invention is the provision of an improved method and apparatus for separating the liquid and vapor phases of a low temperature, i.e., supercooled, liquid gas stream which exhibits an improved separation efficiency for liquid over separation systems employing a Joule-Thomson valve and downstream flash device.

Another object of the present invention is the provision an improved method and apparatus for separating the liquid and vapor phases of a liquified gas stream using a bi-phase rotary separator, wherein work is optionally extracted by the separator.

The above objects are accomplished in the invention by using a bi-phase rotary separator (sometimes also referred to as a bi-phase rotary turbine) located downstream of the main exchanger in a liquid natural gas production facility, which takes a low temperature, e.g., supercooled, liquified feed from the main exchanger and separates it into a liquid phase and vapor phase, without requiring a downstream flash device. The liquid outlet of the bi-phase rotary separator is of sufficient pressure so that there is also no need for the conventional separate pump which pumps the liquid phase outlet to storage. The vapor/liquid separation which occurs in the bi-phase rotary separator is of substantially the same efficiency as that which occurs with the use of the turbo-expander and associated flash device and pump, so that an increased economy of production with lowered capital and maintenance costs can be achieved as compared with a system employing the Joule-Thomson valve, while lower capital and maintenance costs can be achieved as compared with a system employing a turbo-expander.

Since the bi-phase rotary separator is also capable of extracting work from the incoming liquified stream, it is possible, with some loss in conversion efficiency, to also use this extracted work to operate other devices, e.g., compressors, pumps, etc., associated with a liquid natural gas production facility.

It is also possible to use the bi-phase rotary separator in a parallel bypass relationship with a conventional Joule-Thomson valve or turbo-expander, so that if the bi-phase rotary separator is taken out of service, an alternate operational feed stream processing flow path still exists, thereby preventing system shutdown.

BRIEF DESCRIPTION OF THE DRAWINGS

Reference may now be had to the following detailed description of an examplary embodiment of a liquid natural gas production system incorporating a bi-phase rotary separator pursuant to the invention, taken in conjunction with the single FIGURE of the drawing illustrative of a schematic flow diagram of a stream of liquid natural gas conveyed from the main exchanger of a typical liquid natural gas manufacturing facility through the bi-phase rotary separator.

DETAILED DESCRIPTION OF THE INVENTION

Referring now in detail to the single FIGURE of drawing, there is illustrated an arrangement 10 for producing liquid natural gas. It should be appreciated, however, that the invention can be used with other liquid gas stream as well.

The arrangement 10 includes a feed conduit 12 leading from a main exchanger (not shown) of a typical liquid natural gas manufacturing facility, which is well known in the technology.

The conduit 12, which conveys the liquid natural gas output from the liquid natural gas manufacturing facility connects to a bi-phase rotary separator 14. The bi-phase rotary separator may be a commercially available bi-phase rotary separator, such as manufactured by Biphase Energy Systems of Santa Monica, Calif. Since bi-phase rotary separators are, per se, known in the art, a detailed description thereof will not be provided. However, a description of such devices can be found in U.S. Pat. Nos. 3,879,949; 4,298,311; and 4,336,693.

In the inventive arrangement, the bi-phase rotary separator 14 is employed for the purpose of extracting work from the liquid natural gas so as to produce an effluent which is predominantly liquid natural gas and which is then conveyed into the conduit 16. Typically, the system operates at extremely low temperatures, such as supercooled temperatures, the liquid natural gas in the conduit 12 being, for example, at a temperature of $-225°$ F. and at a pressure of 535 psia upstream of the bi-phase rotary separator, while subsequent to passing through the bi-phase separator, in the conduit 16, the temperature of the effluent may be found to be at $-251.7°$ F. and at a pressure of 270 psia. As illustrated, the liquid effluent in conduit 16 is conducted directly into a liquid natural gas storage tank 27, without the need for a pump to increase the liquid pressure for transport to the tank.

The vapor in the conduit 18 exiting from the bi-phase rotary separator passes through conduit 20 and may be utilized as fuel for driving other components within the facility, or may simply be torched if it is not needed for any purpose.

The bi-phase rotary separator 14 which, as indicated hereinabove, may be a commercial unit, may be shaft-coupled to suitable compressors, pumps or generators, enabling the work extracted from the liquid natural gas by the separator to be converted into usable mechanical and/or electrical energy, thereby resulting in a considerable energy saving to the overall system. However, to maintain a high efficiency in separating the liquid phase, there will typically be no output work drawn from the separator.

In the embodiment of the arrangement 10, as illustrated herein, a conduit 26 connects into the conduit 12 in a parallel bypass flow relationship with respect to the bi-phase rotary separator 14. Interposed in the conduit 26 is a Joule-Thomson valve 28, as is currently known in the technology. The outlet of the Joule-Thomson valve feeds a conventional low pressure flash device 30, which has vapor and liquid outlets feeding into conduits 20, 32, respectively. The liquid outlet in turn is supplied to a conventional pump 24 for pumping the liquid natural gas to storage facility 27. During normal operation of the bi-phase rotary separator 14, the Joule-Thomson valve 28 is in a normally not operational (closed) position so as to preclude the flow of any liquid natural gas through the conduit 26; in essence, causing the entire flow of liquid natural gas from the manufacturing facility to flow through the bi-phase rotary separator 14. If, for any reason, the rotary separator 14 is taken out of service, flow of liquid natural gas into the separator is stopped by, for example, a valve 31, and the Joule-Thomson valve 28 is then opened and operational to pass the liquid natural gas at reduced pressure to flash device 30, where it is separated into liquid and gas phases.

Table I below sets forth the operation of the arrangement 10 employing the bi-phase rotary separator 14 for a typical flow of liquid natural gas fed from a liquid natural gas manufacturing facility.

TABLE I

| Liquid Natural Gas Component | Feed Stream (Conduit 12) Moles | Vapor (Conduit 18) Moles | Liquid (Conduit 16) Moles |
| --- | --- | --- | --- |
| Nitrogen | 0.43 | 0.31 | 0.12 |
| Methane | 88.75 | 8.98 | 79.77 |
| Ethane | 6.72 |  | 6.72 |
| Propane | 3.11 |  | 3.11 |

TABLE I-continued

| Liquid Natural Gas Component | Feed Stream (Conduit 12) Moles | Vapor (Conduit 18) Moles | Liquid (Conduit 16) Moles |
|---|---|---|---|
| Iso Butane | 0.46 | | 0.46 |
| Normal Butane | 0.47 | | 0.47 |
| Iso Pentane | 0.04 | | 0.04 |
| Normal Pentane | 0.02 | | 0.02 |
| Total | 100.00 | 9.29 | 90.71 |

As tabulated in Table I, in an arrangement employing the bi-phase rotary separator 14, the feed stream conducted into conduit 12 from the main exchanger of the liquid natural gas (LNG) manufacturing facility is separated into vapor conveyed into conduit 20, and liquid natural gas conveyed into conduit 22 to storage. As shown, of 100 moles initially fed, 90.71 moles are obtained as liquid natural gas which is passed to the liquid natural gas storage, whereas 9.29 moles are present as vapor.

In contrast therewith, Table II, as set forth hereinbelow, illustrates the production of liquid natural gas relative to the amounts of flash gas and vapor obtained when the arrangement 10 conveys the flow through the Joule-Thomson valve 28, and associated flash device 30.

TABLE II

| Liquid Natural Gas Component | Feed Stream (Conduit 12) Moles | Vapor (Conduit 20) Moles | Liquid (Conduit 22) Moles |
|---|---|---|---|
| Nitrogen | 0.43 | 0.32 | 0.11 |
| Methane | 88.75 | 9.44 | 79.31 |
| Ethane | 6.72 | | 6.72 |
| Propane | 3.11 | | 3.11 |
| Iso Butane | 0.46 | | 0.46 |
| Normal Butane | 0.47 | | 0.47 |
| Iso Pentane | 0.04 | | 0.04 |
| Normal Pentane | 0.02 | | 0.02 |
| Total | 100.00 | 9.76 | 90.24 |

In this instance, with the feed stream of liquid natural gas in conduit 12 being identical in composition, the vapor of flash gas conducted into conduit 20 from the low-pressure flash device 30 consists of 9.76 moles, whereas the liquid natural gas conducted to the storage through conduit 22 and transfer pump 24 consists of 90.24 moles for each 100 moles of fed liquid natural gas from the manufacturing facility.

Consequently, when the arrangement 10 utilized the bi-phase rotary separator 14 in lieu of the Joule-Thomson valve 28, 90.71/90.24 = 1.005 times more liquid natural gas is produced. This also results in a lower vapor production by the bi-phase rotary separator, which is 9.76 − 9.29/9.76 × 100 = 4.816% lower than that obtained with the Joule-Thomson valve.

Viewed another way, for a main exchanger feed of 12.2 lb/sec at 535 psia and −225° F., the bi-phase rotary separator, extracting no work, produces a vapor stream of 1 lb/sec at 18 psia at −252° F. and a liquid stream of 11.2 lb/sec at 270 psia and −251.7° F. By contrast, the Joule-Thomson valve arrangement employing a flash device 30 and liquid stream pump 24 produces a liquid outlet of 10.948 lb/sec and a vapor outlet of 1.252 lb/sec, with the vapor temperature and pressure being −251.9° F. and 18 psia, respectively, and the liquid temperature and pressure being −251.6° F. and 110 psia, respectively.

From the foregoing, it is readily apparent that through the intermediary of employing, in a unique manner, a bi-phase rotary separator 14 in the arrangement 10 in lieu of the commonly utilized Joule-Thomson valve 28, associated flash device 30 and liquid pump 24, there is obtained a higher yield of liquid natural gas with a concurrent reduction in vapor, and with usable energy being available through work optionally recoverable by means of the bi-phase rotary separator. In addition, capital and maintenance costs associated with a flash device 30 and pump 24 can be reduced, thereby rendering the entire liquid natural gas production system more economical in operation.

The utilization of the Joule-Thomson valve flash device and pump in the system in a flow bypass relationship with the bi-phase rotary separator ensures that during periods when the rotary separator is inoperative, such as during repairs or replacements, the arrangement may continue operation at a reduced efficiency in the output or yield of liquid natural gas. It is also possible to use a turbo-expander, as described in U.S. application Ser. No. 456,234, in place of Joule-Thomson valve 28 in bypass relationship to the bi-phase rotary separator 14.

While there as been shown and described what is considered to be a preferred embodiment of the invention, it will of course be understood that various modifications and changes in form or detail could readily be made without departing from the spirit or scope of the invention. It is therefore intended that the invention not be limited to the exact form and detail herein shown and described, but only be limited by the scope of the claims appended hereto.

I claim:

1. An apparatus for producing liquified gas with a reduced amount of gas vapor in a liquid gas manufacturing facility, comprising:
    means for supplying a stream of liquid gas from a liquid gas manufacturing facility;
    a first flow conduit for receiving said stream of liquid gas and passing it directly to a bi-phase rotary separator;
    a bi-phase rotary separator having an inlet connected to said first flow conduit, a vapor outlet, and a liquid outlet;
    means for coupling the liquid outlet of said bi-phase rotary separator directly to a liquid gas storage means, wherein said coupling means is a direct conduit connection between said liquid outlet and storage means with pumping pressure for liquid supplied to said storage means being provided by said rotary separator; and
    means for conducting gas vapor from said vapor outlet.

2. An apparatus as in claim 1, wherein said gas is a natural gas.

3. An apparatus as in claim 1, wherein said bi-phase rotary separator includes means for extracting work from said stream of liquid gas.

4. A method for producing liquified gas with a reduced amount of gas vapor in a liquid gas manufacturing facility, comprising the steps of:
    supplying a stream of liquid gas from a liquid gas manufacturing facility;
    feeding said stream of liquid gas without passage through a flash device directly into a bi-phase rotary separator, said separator separating said stream into respective liquid and vapor phases, and supplying said liquid and vapor phases at respective liquid and vapor outlets thereof; and feeding the liquid phase at the liquid outlet of said separator directly to a storage facility without further pressurizing said liquid phase.

5. A method as in claim 4, wherein said gas is a natural gas.

6. A method as in claim 4, further comprising the step of extracting work from said stream with said bi-phase rotary separator.

7. A method as in claim 4, further comprising the step of using said vapor phase as an energy source in said manufacturing facility.

* * * * *